(12) United States Patent
Wooten (10) Patent No.: US 11,585,484 B1
(45) Date of Patent: Feb. 21, 2023

(54) HAT AND CLOTHING STORAGE AND DISPLAY ARTICLE

(71) Applicant: William Wooten, Covington, TN (US)

(72) Inventor: William Wooten, Covington, TN (US)

( * ) Notice: Subject to any disclaimer, the term of this patent is extended or adjusted under 35 U.S.C. 154(b) by 376 days.

(21) Appl. No.: 16/751,206

(22) Filed: Jan. 24, 2020

(51) Int. Cl.
  *F16M 13/02* (2006.01)
  *B60R 7/10* (2006.01)
  *B60R 11/00* (2006.01)

(52) U.S. Cl.
  CPC ............. *F16M 13/02* (2013.01); *B60R 7/10* (2013.01); *B60R 2011/0003* (2013.01); *B60R 2011/0056* (2013.01); *B60R 2011/0077* (2013.01)

(58) Field of Classification Search
  CPC .................................. B60R 7/10; F16M 13/02
  USPC ......................................................... 224/545
  See application file for complete search history.

(56) References Cited

U.S. PATENT DOCUMENTS

| | | | | | |
|---|---|---|---|---|---|
| 1,601,715 | A | * | 10/1926 | Bryers | A47G 25/08 211/89.01 |
| 1,739,801 | A | * | 12/1929 | Pitts | A47F 7/147 248/206.3 |
| 2,146,109 | A | * | 2/1939 | Curtis, Jr. | A47G 25/10 223/66 |
| 2,157,001 | A | * | 5/1939 | Morley | B60R 7/10 224/927 |
| D128,287 | S | * | 7/1941 | Lauronen | 224/927 |
| 2,302,300 | A | * | 11/1942 | William | B60R 9/02 224/571 |
| 2,341,643 | A | * | 2/1944 | Mincenberg | A47G 25/10 223/66 |
| 2,500,881 | A | * | 3/1950 | Stader | A47G 25/08 224/927 |
| 2,549,391 | A | * | 4/1951 | Secord | B60R 7/10 224/927 |
| 2,643,773 | A | * | 6/1953 | Nicholson | A47G 25/10 211/32 |
| 2,717,110 | A | * | 9/1955 | Rogers | B60R 7/10 224/927 |
| 2,720,984 | A | * | 10/1955 | Gotowka | A47G 25/10 211/89.01 |
| 2,947,420 | A | * | 8/1960 | Behrendt | A47G 25/10 211/31 |
| 4,077,554 | A | * | 3/1978 | Goode | B60R 9/12 224/559 |

(Continued)

*Primary Examiner* — Nathan J Newhouse
*Assistant Examiner* — Lester L Vanterpool
(74) *Attorney, Agent, or Firm* — William S. Parks (57) ABSTRACT

This disclosure pertains to a unique, versatile article for providing both storage and display of clothing, headwear, and other items within the internal area of an automated vehicle. Such an article is symmetrical in shape with a three-dimensional configuration having two opposing ends with curved edges and a bottom portion extending outward and below a top ovate portion with four corner regions having leg components that incline upward. Such an article allows for placement of headwear, clothing, and other types of items over the ovate top portion with the inclined legs of the bottom extended portion present for retention thereof. Clips may be attached for facilitating such retention as well, particularly on the bottom portion legs. Such an article may be placed anywhere on and attached to internal vehicle portions, including a dashboard, windows, seat backs, and the like, utilizing adhesives, suction cups, and other means.

3 Claims, 8 Drawing Sheets

(56) References Cited

U.S. PATENT DOCUMENTS

| | | | | | |
|---|---|---|---|---|---|
| 4,231,501 | A | * | 11/1980 | Goode | B60R 9/12 |
| | | | | | 224/559 |
| 4,821,891 | A | * | 4/1989 | Williams | A47G 25/10 |
| | | | | | 211/181.1 |
| 5,104,083 | A | * | 4/1992 | Shannon | B60R 7/10 |
| | | | | | 224/927 |
| 5,169,007 | A | * | 12/1992 | McHendry | A47F 7/06 |
| | | | | | 211/32 |
| 5,390,837 | A | * | 2/1995 | Ruffolo, Jr. | B60R 9/06 |
| | | | | | 224/570 |
| 5,573,214 | A | * | 11/1996 | Jones | B60N 3/103 |
| | | | | | 248/205.5 |
| D397,365 | S | * | 8/1998 | Johnson | D20/43 |
| 5,890,689 | A | * | 4/1999 | Johnson | B60R 7/10 |
| | | | | | 224/927 |
| 5,960,572 | A | * | 10/1999 | DeVito | G09F 7/18 |
| | | | | | 40/643 |
| 6,186,376 | B1 | * | 2/2001 | Hyun | A47G 25/32 |
| | | | | | 224/927 |
| 8,640,890 | B2 | * | 2/2014 | Schiller | F16B 47/00 |
| | | | | | 211/85.15 |
| 9,855,897 | B2 | * | 1/2018 | Kniepmann | B60R 11/00 |
| 2014/0021230 | A1 | * | 1/2014 | Sanchez | B60R 7/10 |
| | | | | | 224/275 |

\* cited by examiner

HAT AND CLOTHING STORAGE AND DISPLAY ARTICLE

FIELD OF THE DISCLOSURE

This disclosure pertains to a unique, versatile article for providing both storage and display of clothing, headwear, and other items within the internal area of an automated vehicle. Such an article is symmetrical in shape with a three-dimensional configuration having two opposing ends with curved edges and a bottom portion extending outward and below a top ovate portion with four corner regions having leg components that incline upward. Such an article allows for placement of headwear, clothing, and other types of items over the ovate top portion with the inclined legs of the bottom extended portion present for retention thereof. Clips may be attached for facilitating such retention as well, particularly on the bottom portion legs. Such an article may be placed anywhere on and attached to internal vehicle portions, including a dashboard, windows, seat backs, and the like, utilizing adhesives, suction cups, and other means.

BACKGROUND OF THE DISCLOSURE

The capability of storing and simultaneously, if desired, displaying clothing, headwear, and other like articles within the internal portions of a vehicle have been quite limited over the years. Typical vehicles will include certain hooks in the rear portion thereof for the purpose of either directly hanging an article of clothing or permitting a hanging device to attach thereover for placement of the subject clothing (or headwear, etc.) as needed. Such hooks may either be provided outwardly within the vehicle extending from an internal door frame or wall, or provided as an extending (and returning) movable hook in the same basic area, albeit allowing for a recessed device that may be utilized on demand. Although such alternatives do provide a semblance of utility for such a purpose of clothing placement and storage during transport, such locations of hooks require the user to drape the subject clothing, etc., downward over the rear door window, potentially causing difficulties as to visibility. The static location of such built-in hanging devices leaves the user at the mercy of the resultant disposition of such hanging clothing articles, etc. The user may wish to place, for instance, wet articles at a location that does not cause visibility issues and potentially over a container or other article to catch dripping water and moisture. Thus, for example, the potential for hanging such wet clothes (and the like) at a rear window that is not located over an upholstered seat, but, instead, a flat floor that may be covered with an impermeable (tarp, for instance) while retained at a height for such a purpose, and additionally in a manner that allows for a broader extension of the wet clothing (rather than over a hook, for instance), is simply not accorded users as of today.

Additionally, such hooks are not the most reliable as to retaining subject clothing, etc., as the size and configuration of such hooks are such that anything of a too-large size or cumbersome shape may easily become detached (or at least fall) from the hooks themselves. Certainly, if the user has sought usage of such a hook for keeping a clothing article in a certain shape, or for that matter, a wet article from falling down to aid in drying out, the hooks provided for such purposes lack reliability for the most part.

Furthermore, a user may seek to not only store or hang clothing, etc., but also a means of displaying outwardly certain logos, messages, etc., therefrom. For example, certain headwear, particularly baseball caps, as a non-limiting example, are known to include over-the-bill representations (team names, logos, outward messages, and the like) that a user may wear for the purpose of supporting a team, delivering unspoken positions, etc. While worn such is easily accomplished, certainly. However, the user may wish to display such a logo, message, etc., when not worn and, in this situation, while driving or riding in a vehicle. Such a display potential is limited to, for instance, simply placing a cap on a dashboard for outward display through a windshield. This may be problematic, however, ostensibly because of the lack of securing such a headwear article to the dashboard, thus potentially having such a cap move and/or fly up in such a manner as to compromise the driver's visibility. A user may further wish to store a collection of caps on a dashboard within a vehicle, particularly with one outward facing and the others nested behind in a uniform fashion. The simple alignment of caps together without any base leaves the potential for detachment and movement of all, such as, for example, with a quick brake stoppage, a swerve to avoid an obstacle, or even a wind gust with an open window. As such, to provide a safer alternative in this manner, there should be provided an article that allows for increased capability for the user's benefit. Nothing is provided in this way within the pertinent art.

As it is, then, the ability to permit a user the capability of utilizing an on-demand article for clothing, headwear, etc., display/storage within the internal region of an automated vehicle (car, van, minivan, truck, semi, etc.), particularly for any such purpose with a versatile device for any such desired use, is simply not present within the pertinent industry. In other words, the provision of an article that may be utilized for display of a cap outwardly on a dashboard, may hold multiple caps simultaneously in such a manner, may be utilized as a window-attached clothing hanging article, or even on the back of a seat (clipped or otherwise attached with clothing, etc., hanging therefrom), has not been disclosed or utilized as of today. The versatility and utility of such an article would be a great benefit for vehicle users of any type; unfortunately, again, to date, such an article has yet to be explored within the pertinent vehicle storage/display industry to date.

Advantages and Summary of the Disclosure

A distinct advantage of the storage/display article is the capability of placing or utilizing the article anywhere within the confines of a vehicle on demand. Another advantage is the capability of utilizing the storage/display article to retain any type of headwear (caps, helmets, visors, and the like) or clothing (shirts, jackets, pants, coats, and the like) over the base thereof with reliable retention thereof whether utilized in a longitudinal or latitudinal fashion. Yet another advantage of the storage/display article is the further utilization of a means to secure such an article to a selected surface or implement, including suction cups to windows and flat surfaces, adhesives strips/pads to any suitable surface, whether horizontally or vertically, and clips to seat arms, headrest extensions, and the like. Still another advantage of the storage/display article disclosed herein is the configuration of the structure thereof to improve provide a rounded edge within a first plane for placement thereover and extended and curved/inclined legs within a second plane to disposition on the outer portion of a subject clothing/headwear article for passive retention thereto when used. Still another advantage of the disclosed storage/display article is the configuration to allow for placement/display of a cap horizontally over the top curved edge plane and retention in relation to the curved/inclined legs of the bottom plane with the bottom plane placed on a surface, or, alternatively, display of a cap vertically in the same manner with the article disposed in a vertical fashion to a selected surface.

Accordingly, this disclosure encompasses a storage/display article comprising a first upper component and a second lower component, wherein said first component is a structure having two opposing curved ends and two opposing middle parallel and straight edges, said first component present within a single plane and further having a straight midline component running between the outermost edges of said opposing curved ends, wherein said second component has two separate parallel legs extending below said first upper component, wherein each of said second component parallel legs has ends that are parallel to one another and that turn upward from said legs at uniform inclines or curves, wherein said ends of said second component parallel legs extend to points that are beyond the outermost edges of said two opposing curved ends of said first upper component. Additionally, the disclosure includes the inclusion of attachment means of said article to different surfaces, with such means selected from suction cups, adhesives, and clips, whether incorporated within the article or attached thereto externally. Thus, the disclosed storage/display article may be attached to different surfaces (and removed therefrom) on demand.

The utilization of opposing curved edges within the upper component allows for a suitable broad structure to place different implements over for storage and/or display purposes. The bottom component having legs that are parallel and extending beyond the opposing curved edges of the upper component provides a recess-like portion the allows for part of the subject clothing, headwear, etc., article to be placed for passive secure containment and retention to the storage/display article. The inclined/curved leg ends further accords secure retention through a disposition that prevents movement of the stored/displayed clothing, etc., article from raising or maneuvering over or past while stored/displayed in such a fashion. Thus, the broad curved opposing ends allows for a cap, as one example, to be placed over for shape retention and containment, while the extended curved/inclined legs engage with the bill of the cap so as to direct the same inwardly, according retention thereto without any need for other implements, particularly when disposed of horizontally (with, furthermore, as possible non-limiting examples) the utilization of adhesives on the bottom portion thereof on a dashboard surface. In this manner, the cap may be displayed while stored on the dashboard and any logo, message, etc., on the cap face may be seen through the windshield. Likewise, such may be accomplished with a plurality of caps stacked in such a fashion with the first outwardly displayed and the other behind and nested while retaining cap shape in relation to the curved opposing edges of the upper first component of the storage/display article. For clothing, such as, for instance, a jacket, the storage/display article may be placed and secured to, for instance, an internal window within a subject vehicle at any height/level as desired. The jacket collar may then be spread over the vertically disposed top curved edge of the upper first component, thereby according a broad and secure retention thereto. The placement of such a jacket in this manner would thus further permit sufficient material to be introduced between the upper and bottom components of the storage/display article such that the jacket is, again, spread outwardly (for wrinkle prevention and/or, if wet, drying facilitation) and placed on a window in such a manner as not to impede driver visibility. The bottom component legs provide the recess as noted above, and the curved/inclined leg ends allow for prevention of the subject jacket from simply sliding off as such disposed ends may either simply impede any such movement passively, or, if desired, clips (whether built-in or supplied) may further be connected to a subject jacket for such a purpose. The same may thus be undertaken for over types of clothing, and even a plurality thereof, if needed and/or desired, as the recess between upper and bottom components of the storage/display article allows for multiple articles to be aligned therebetween on demand, as well. Additionally, as alluded to above, the vertical disposition of the storage/display article may be undertaken with headwear with such caps, etc., simply placed over the curved opposing edges of the upper component and the inclined/curved legs of the bottom component preventing movement off the storage/display article, much like described above. Furthermore, as noted previously, the storage/display article may be attached to, for instance, extensions of headrests in order to be placed on the back of a seat within a vehicle. Clips (or other like devices, including ties, snaps, and the like) may be utilized for such a purpose and the vertically disposed storage/display article would be utilized as above. Certainly, as noted above, the storage/display article may also be disposed in a latitudinal fashion while vertically aligned (with the opposing curved edges of the first upper component, for example, present across from one another at the same level), rather than longitudinally (with the curved opposing edges of the first upper component present with one located above the other).

The storage/display article disclosed herein may be of any suitable construction that allows for the disposition possibilities and storage/display potential (clothing, headwear, etc.) of one to a plurality of such stored articles without any appreciable level of compromised structural integrity thereto. The storage/display article must thus not exhibit any appreciable distortion or warping during and/or after utilization for the purposes noted herein. Thus, the base construction materials utilized herein must exhibit dimensional stability when utilized within a vehicle, as well as when subjected to temperatures typically present therein (e.g., the heat associated with summer, for instance, within parked vehicles). Thus, such materials must not melt or warp not only from stored/displayed article weight, but also due to temperature exposure as well. To that end, then, certain metals may be utilized for such an article, if desired, including, without limitation, aluminum, stainless steel, brass, and the like. Potentially more preferred for such materials, particularly in terms of costs and availability thereof, are thermoplastics and thermosets, including, without limitation, polyolefins (such as high-density polyethylene), polyacrylic, polycarbonate, ABS, polystyrene, and the like. Again, the ability for such materials to withstand certain high temperatures (such as up to 125° F.) without distortion and provided at a density that will withstand, for example, at least 2 kilograms of pressure without warping, etc., as well. The first upper component of the disclosed storage/display article is ostensibly configured with individual pipes or rods that are appropriately manipulated to meet the required structural descriptions noted above. The curvature of the opposing ends of the first upper component may be anywhere from 180° to 60° (measuring the arc as a circle portion). The ends of the legs within the second bottom component may be curved/inclined such that the very end of end leg is from 30-60° from the leg itself, more preferably about 45° therefrom.

As for the dimensions of the disclosed storage/display article, the first upper component may be from 12 to 30 inches long, and from 4 to 10 inches wide. The length of the second bottom component legs may then be from 14 to 32 inches (with extension beyond the outermost edges of the curved opposing ends of the first upper component, as noted above. The width from one extended leg to the other should be more than that of the first upper component; thus from 6 to 12 inches roughly. Of course, if the user desires different dimensions, such may be undertaken without moving outside the scope of this disclosure. The rods/pipes themselves should be from ¼ to ½ inch in diameter; such may be uniform through the structure or altered, if desired with certain portions exhibiting different measurements, if needed and/or desired. The weight of the disclosed storage/display article may be from 0.25 kilogram (roughly $\frac{1}{8}^{th}$ pound) to 1 kilogram (about 2.2 pounds) depending on the materials therein. Certainly, as alluded to above, a lighter structure with sufficient strength (such as about 5 pounds tensile strength to avoid distortions during utilization, again), whether at ambient or elevated temperatures (125° F., for example, again), would be potentially preferred, both from a cost perspective and an actual utilization standpoint.

It should be noted, as well, that such a disclosed storage/display article may be utilized for purposes other than headwear and clothing. A user may, in other words, attach, secure, etc., any type of stored and/or displayed article (stuffed animals, toys, fishing lures, fishing lines, utensils, photographs, pamphlets, reading materials, etc., the list is really myriad and endless) as long as the articles do not harm the storage/display article and such can be utilized with the attachment alternatives noted herein (suction cups, clips, adhesives). Only the user's imagination limits the overall utility of such an article, in other words.

DETAILED DESCRIPTION OF THE DRAWINGS AND PREFERRED EMBODIMENTS

Without any intention of limiting the scope and breadth of the invention described herein, certain potentially preferred embodiments are presented below in accordance with the drawings in support thereof.

Figure 1:
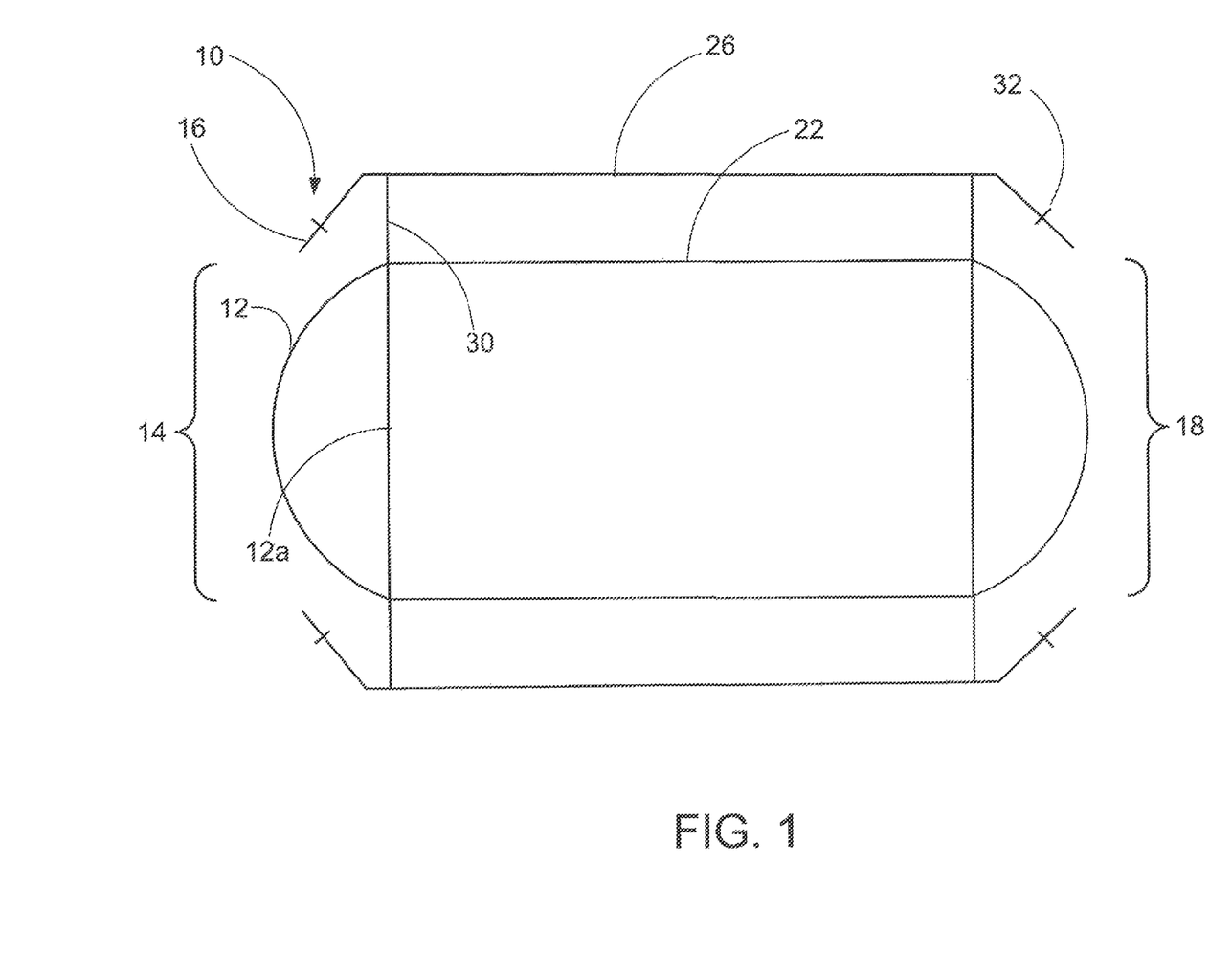
FIG. 1 depicts an aerial view of one potential embodiment of the storage/display article disclosed herein.

FIG. 1 thus shows a potentially preferred storage/display article 10 having opposing curved edges 12 of a first upper component 14 including parallel external edges 22 and a midpoint rod structure 20 running between the outermost points of the curved edges 12A. A second bottom component 18 includes parallel legs 26 having opposing ends 28 that exhibit an angled portion 16 leading inward toward the upper component 14 at an angle roughly 45 degrees from the parallel legs 26. There are further present connecting legs 30 leading from the upper component 14 to the lower component 18 to provide a singular unitary article 10. Also present are incorporated clips 32 for attachment facilitation whether to an implement or a storage/display article.

Figure 2:
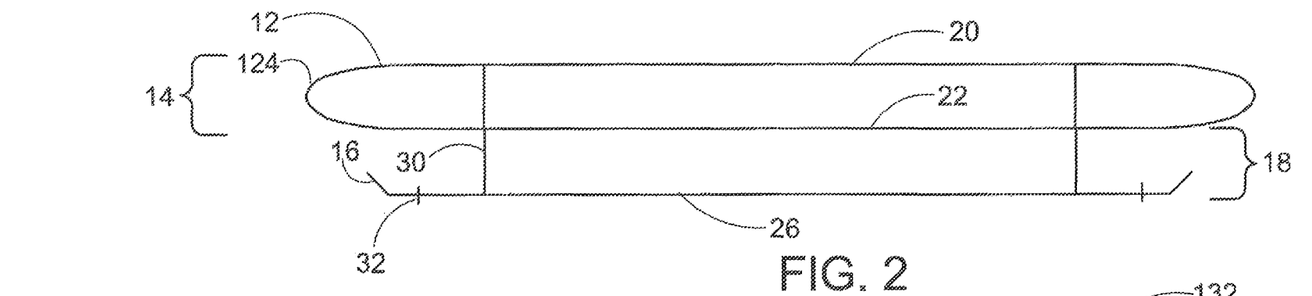
FIG. 2 depicts a side view of the article of FIG. 1.

FIG. 2 shows FIG. 1 in a side view thereof with the lower component leg 22 leading to the angled ends 28 and the upper component side edges 20 leading to the curved opposing ends 12.

Figure 3:
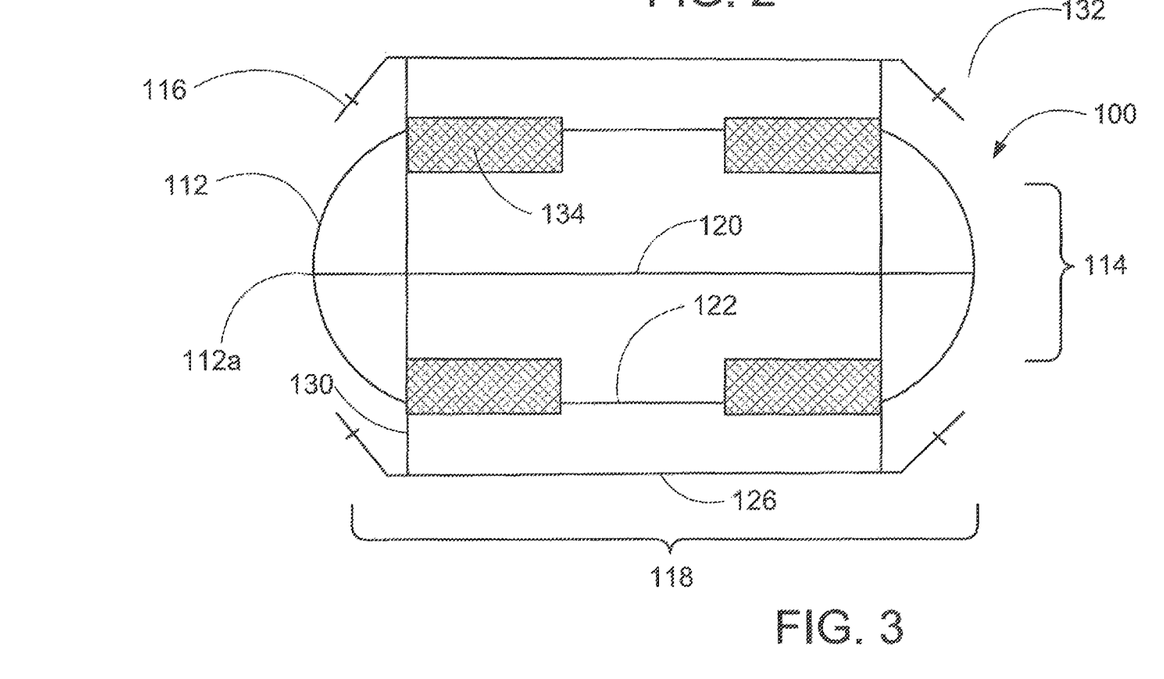
FIG. 3 depicts an aerial view of another potential embodiment of the storage/display article disclosed herein with adhesives pads for attachment purposes.
Figure 4:
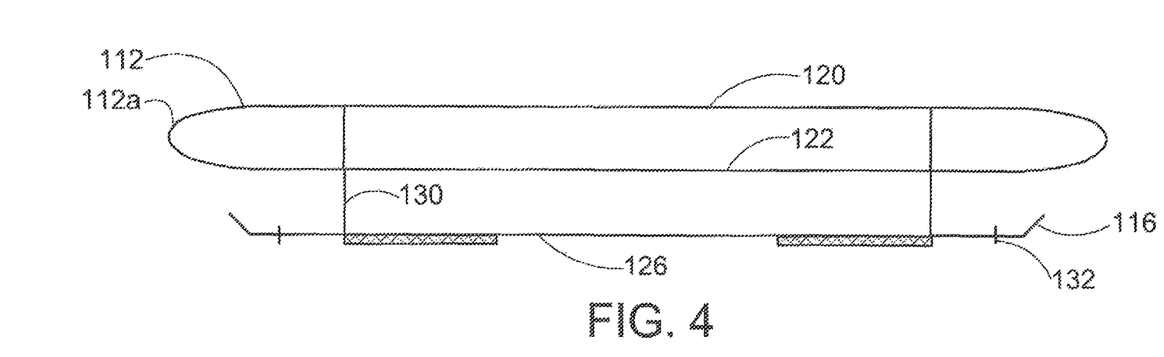
FIG. 4 depicts a side view of the article of FIG. 3.

FIG. 3 thus shows a different possible embodiment of a storage/display article 100 with the same basic structures as above (opposing curved edges 112, outermost points thereof 112A, midpoint rod structure 120, and parallel side edges 122 of the upper component 114, and the parallel legs 122, angled leg ends 128, angled portions 116, and incorporated clips 132, of the second bottom component 118, with connecting legs 130 between both components) with adhesive pads 134 attached to the upper component 114 for attachment purposes. Such adhesives 134 may be of any type that accords sufficient connection on demand and release, as well, in the same manner. Thus, certain epoxies, polyacrylates, and the like, may be employed with a cover film removable (not illustrated) as a protectant prior to such utilization). FIG. 4 shows the side view of FIG. 3 with the same component parts and the adhesives 134 present for such a purpose. Certainly, such adhesive pads 134 may be removable and replaced with new pads (not illustrated) should the adhesive capability thereof wear out or otherwise become compromised.

Figure 5:
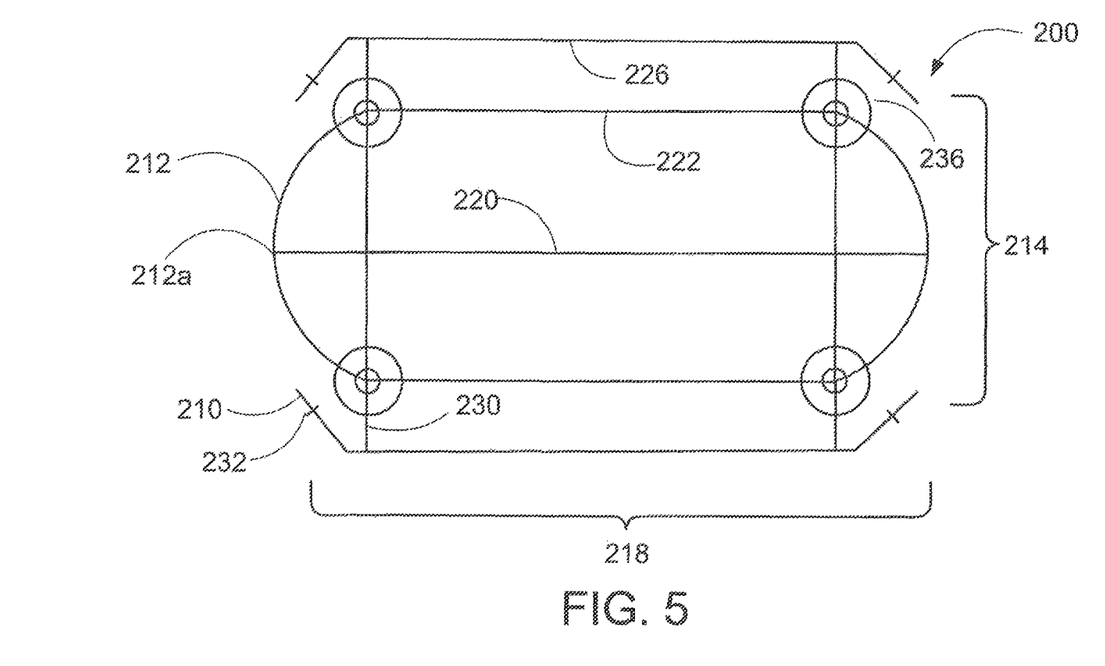
FIG. 5 depicts an aerial view of another potential embodiment of the storage/display article disclosed herein with suction cups for attachment purposes.
Figure 6:
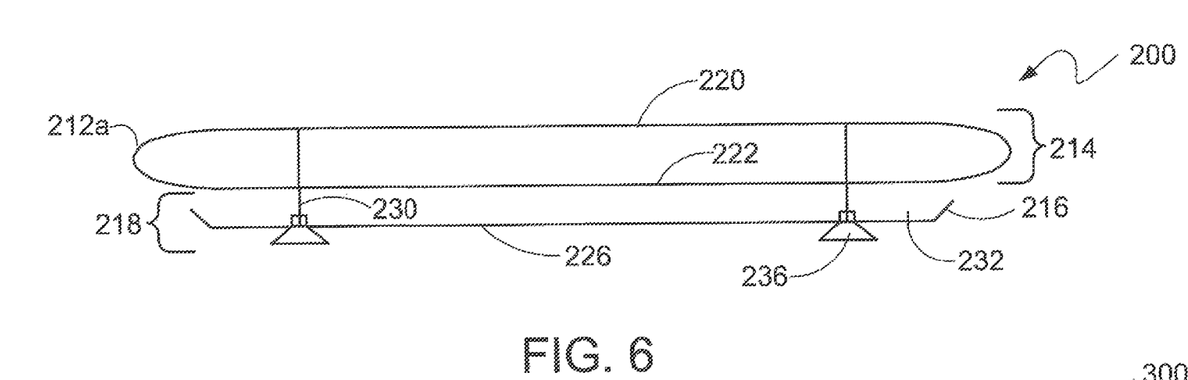
FIG. 6 depicts a side view of the article of FIG. 5.

FIG. 5 thus shows another different possible embodiment of a storage/display article 200 with the same basic structures as above (opposing curved edges 212, outermost points thereof 212A, midpoint rod structure 220, and parallel side edges 222 of the upper component 214, and the parallel legs 222, angled leg ends 228, angled portions 216, and incorporated clips 232, of the second bottom component 218, with connecting legs 230 between both components) with suction cups 236 attached to the upper component 214 for attachment purposes. FIG. 6 shows the side view of FIG. 5 with the same component parts and the suction cups 236 present for such a purpose.

Figure 7:
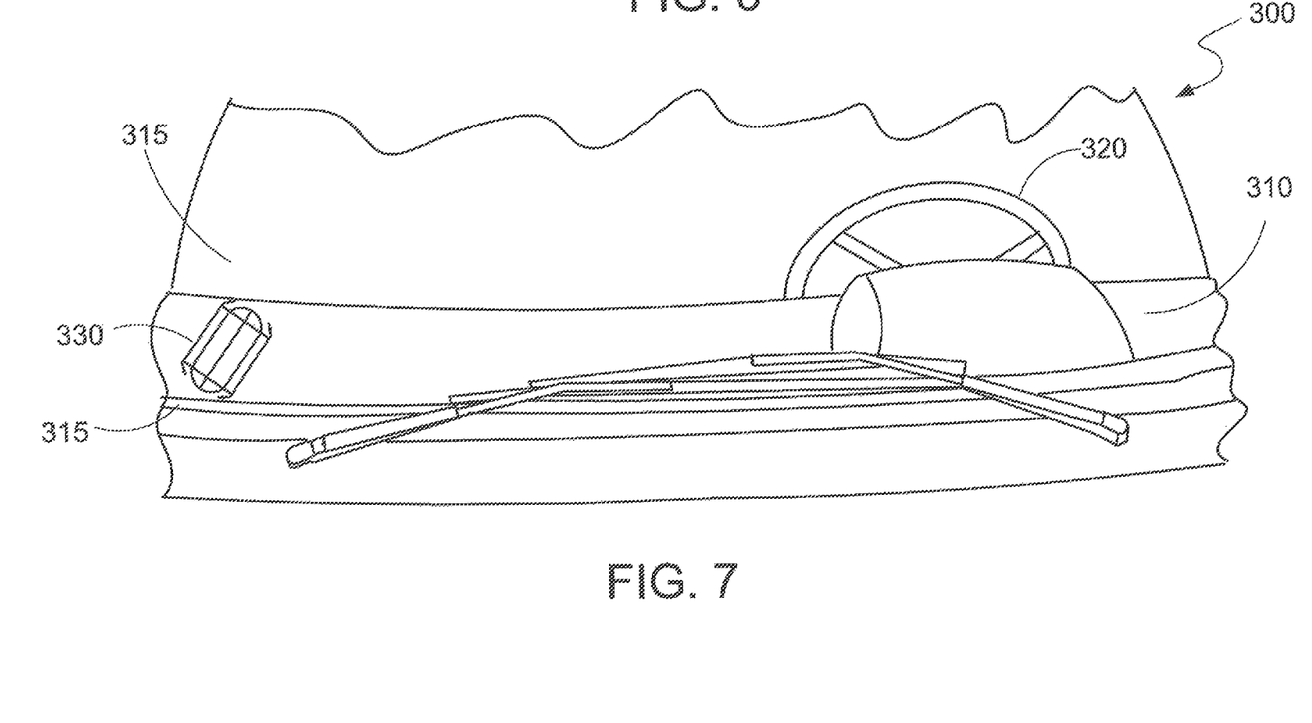
FIG. 7 shows a front perspective view of a potential embodiment of the disclosure of the placement of the article of FIG. 1 on a vehicle dashboard.
Figure 8:
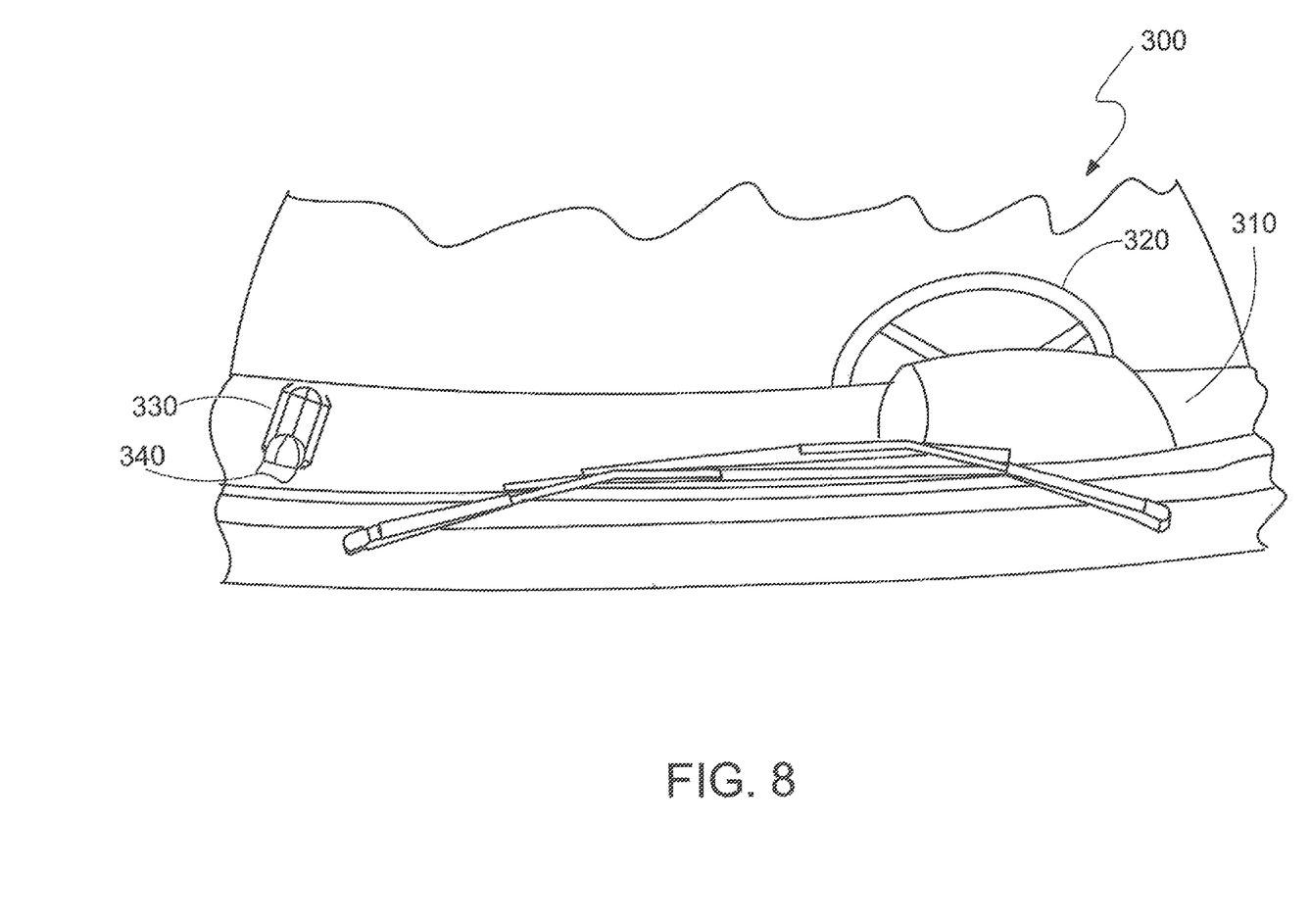
FIG. 8 shows the article of FIG. 7 with a cap displayed thereon.

FIGS. 7-14 thus show the embodiments of FIGS. 1-6 utilized for storage and/or display purposes. FIG. 7 shows a front perspective view of a view into a vehicle 300 having a steering wheel 320 behind a dashboard 310. The dashboard is behind a windshield 315 that leads downward to a vehicle hood 318. Within the vehicle 300, the dashboard 310 exhibits sufficient room for placement of a display/storage article 330 as disclosed herein for viewing through the windshield 315. FIG. 8 thus shows the placement of a single cap 340 on the display/storage article 330 for outward display thereof through the windshield 315. Certainly, if desired, the user may also place the cap 340 on the opposing end of the display/storage article 330 for display/storage inwardly within the vehicle 300 as well.

Figure 9:
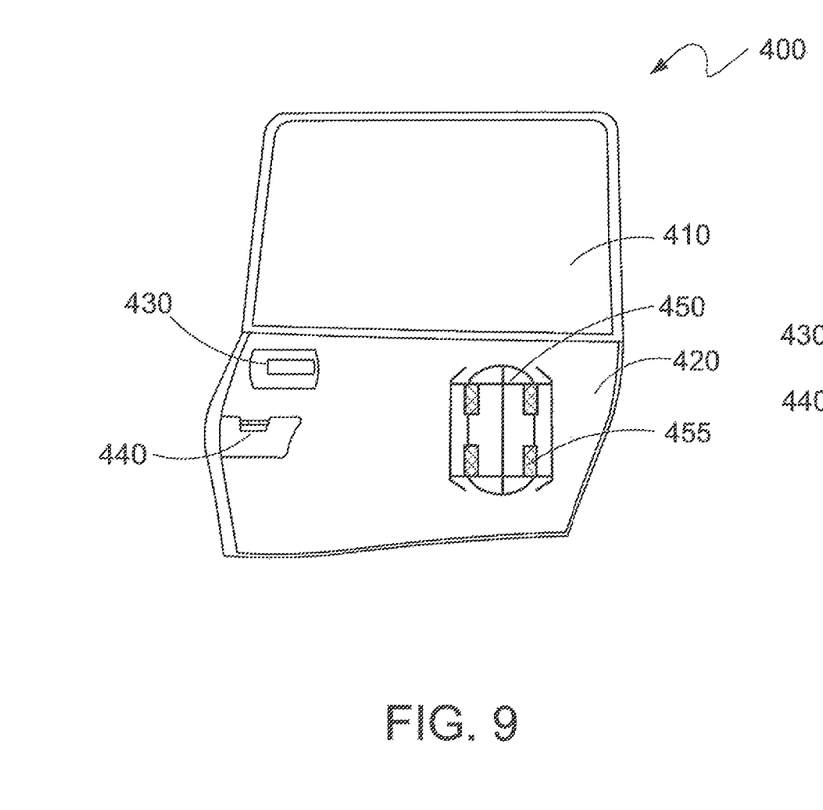
FIG. 9 shows a side perspective view of a potential embodiment of the disclosure of the placement of the article of FIG. 3 on a vertical flat surface (passenger door) within a vehicle.
Figure 10:
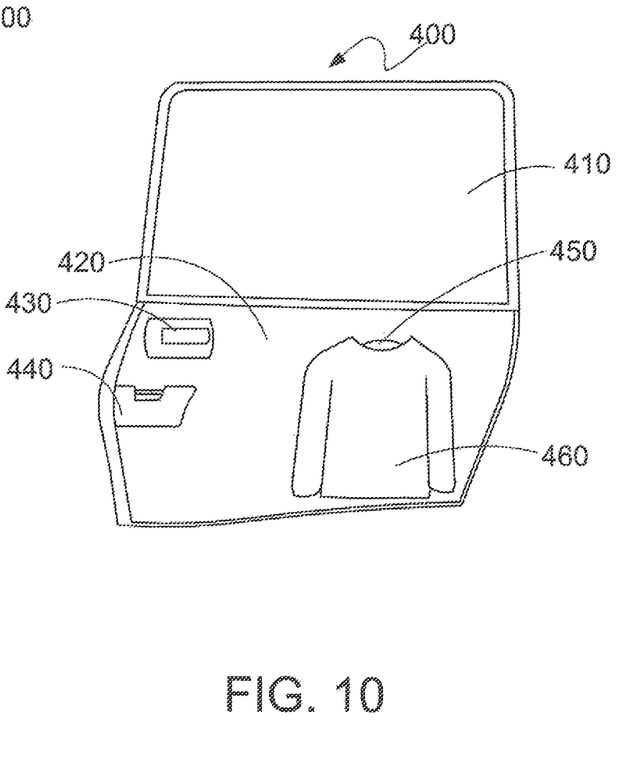
FIG. 10 shows the article of FIG. 9 with a jacket placed thereover for display and storage.

FIG. 9 provides a view of a passenger door 400 of a vehicle having a window 410, a panel 420, a door handle 430, and a window operator 440. Attached to at least a flat portion on such a door panel 420 is a display/storage article of the disclosure 450 through contact and attachment through the adhesive pads 455 present thereon. Certainly, in this situation, a passenger door serves as one non-limiting possibility for such placement utilizing adhesive pads 455; any type of door or flat surface with sufficient surface area for exposure and contact with the adhesive pads 455 (whether 1, 2, 3, or 4 thereof) would suffice for such a display/storage purpose). FIG. 10 shows the placement of a jacket 460 over the display/storage article 450, thereby allowing such stowage and transport of such a clothing article without covering any windows during operation. Although a jacket is exemplified as a clothing article, it would be well understood that such a display/storage article may be utilized for any type of clothing, bags, purses, luggage, sports paraphernalia, and the like, with myriad possibilities as long as such stored and/or displayed articles placed thereon are not too heavy to dislodge or detach such a display/storage article 450 from the surface to which it is adhered.

Figure 11:
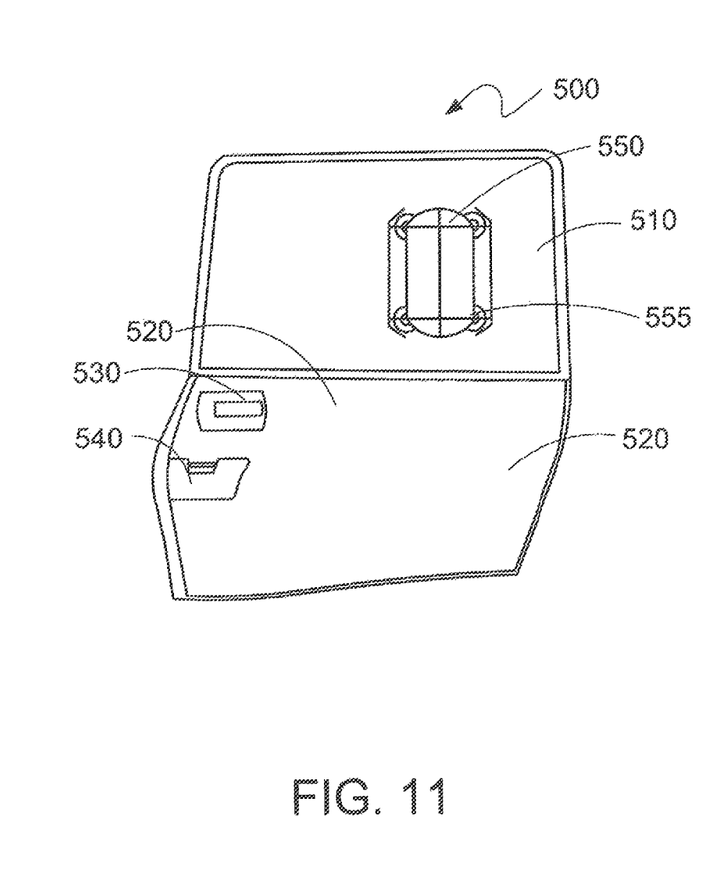
FIG. 11 shows a side perspective view of a potential embodiment of the disclosure of the placement of the article of FIG. 5 attached to a vehicle window in vertical fashion.
Figure 12:
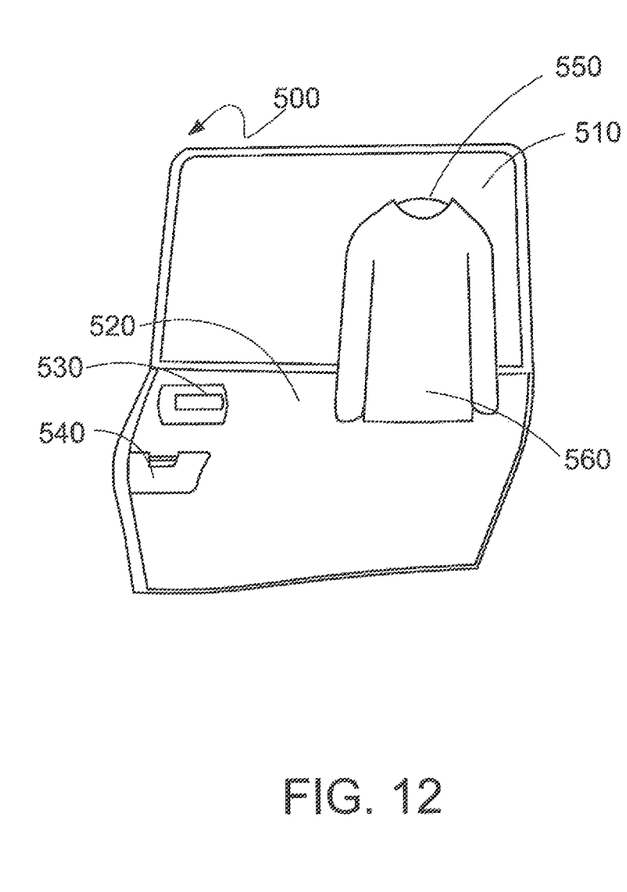
FIG. 12 shows the article of FIG. 11 with a jacket placed thereover for display and storage.

FIG. 11 shows a passenger door 500 as above (and thus as non-limiting in the same fashion as described previously) having a door panel 520, a window 510, a door handle 530, a window operator 540, and the attachment of a display/storage article of the disclosure 550 (through suction cups 555 attached with vacuum force to the window 510). FIG. 12 shows the placement of a jacket 560 thereon the display/storage article 550 for selected placement thereof by the user. Such a possibility allows for suction cup utilization for attachment to any smooth surface of a subject vehicle, including, without limitation, any desired window location (presumably to avoid any interference with a driver's sight lines while driving, of course). Additionally, as alluded to above, although a jacket is exemplified as a clothing article, it would be well understood that such a display/storage article may be utilized for any type of clothing, bags, purses, luggage, sports paraphernalia (such as baseball gloves, helmets, etc.), and the like, with myriad possibilities as long as such stored and/or displayed articles placed thereon are not too heavy to dislodge or break the suction seal of such a display/storage article 550 from the smooth surface to which it is adhered. Furthermore, a smooth surface may be a window, as above, or a plastic, metal, or other like surface that allows for suction cups to be sealed thereto and retain weight of stored articles thereon.

Figure 13:
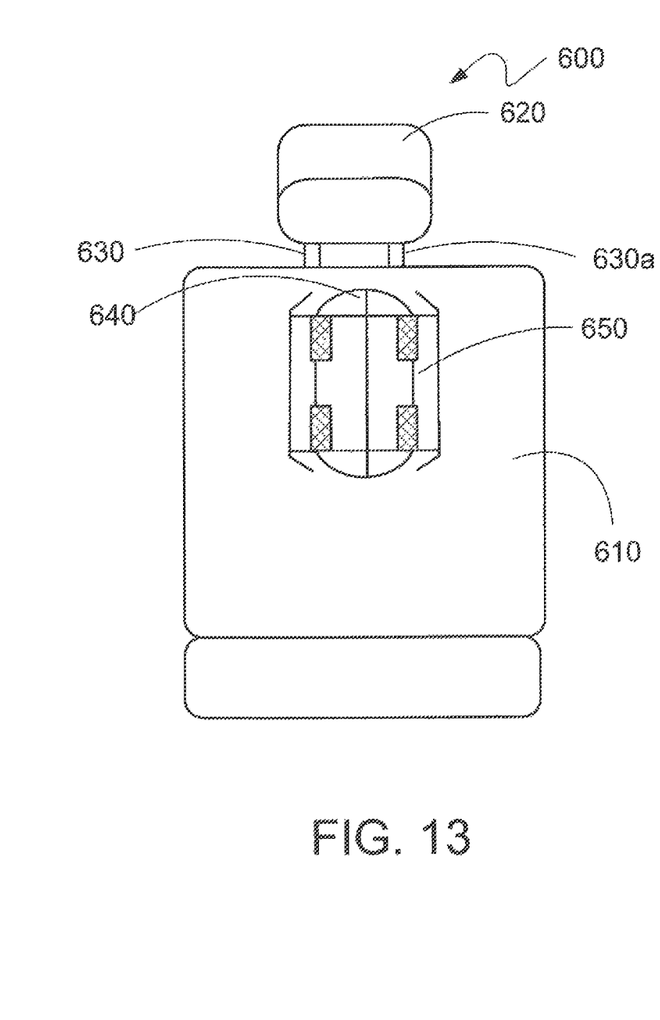
FIG. 13 shows a side perspective view of a possible embodiment of the disclosure of the placement of the article of FIG. 1 to the back seat of a vehicle in vertical disposition.
Figure 14:
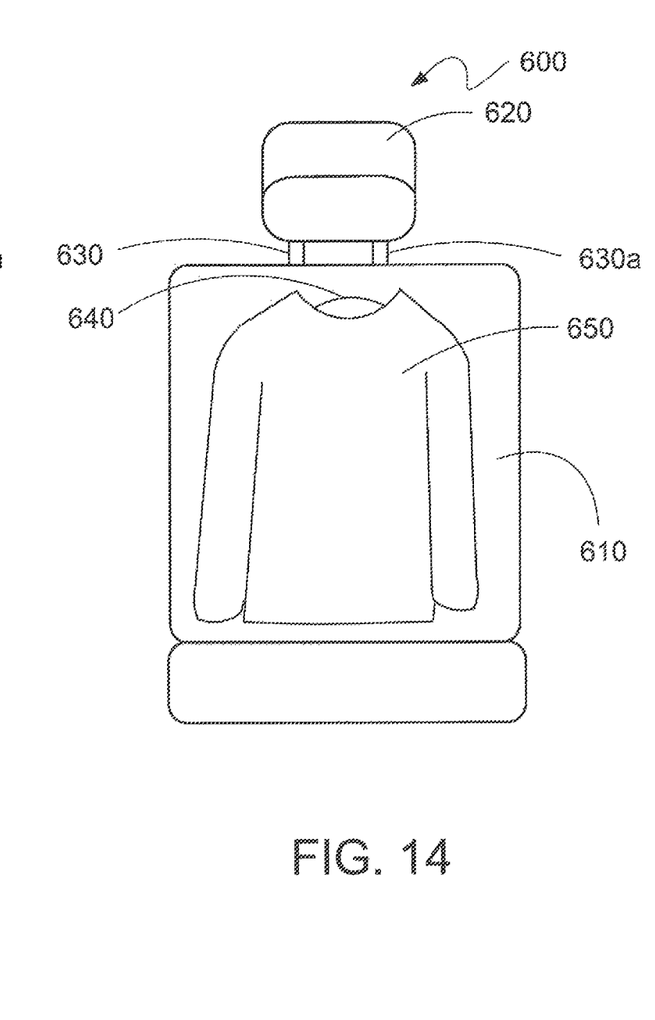
FIG. 14 shows the article of FIG. 13 with a jacket placed thereover for display and storage.

FIG. 13 shows the back of a vehicle seat 600 having an upper back portion 610 and a headrest 620 (which includes metal or like shafts (not illustrated) to which clips 630, 630A (or hooks or the like) may be attached to allow for stowage thereof such a display/storage article 640, as shown. FIG. 14 shows a jacket 650 placed over the display/storage article 640 for storage and/or display thereof in such a manner. This allows, as above, for the jacket to be placed in a manner that will not obstruct a driver's view as well as permit a sufficient height for a more even stowage thereof (such as to reduce wrinkling, etc., while stowed). Of course, also as above, jackets are non-limiting as to the potential utilization of such a display/storage article in this manner and any number of items may be employed in relation thereto as long as the attachment of the display/storage article remains intact during utilization.

Thus, the overall storage/display article, method, and system permits a user the full complement and versatility of the base structure to permit placement (and thus storage and/or display) of any type of article within the confines of a vehicle. Such a storage/display article allows for selected placement for such a purpose to not only best ensure driver visibility is not compromised by such storage/display activities, but also that such stored and/or displayed articles are properly and securely retained to avoid unnecessary and undesirable maneuverability of such stored and/or displayed articles while the subject vehicle is driven. In this manner, a versatile article (method and/or system) is accorded the user to best ensure selected display and/or storage of certain articles (clothing, headwear, etc.) may be undertaken as selected by such a user without possibility of distortion/warping of the storage/display article itself, and the unwanted movement of the stored and/or displayed article itself during vehicle utilization. The user may thus display certain items on demand without any problems therewith, and/or store articles requiring certain attention (wet clothing, for instance) optimally within the confines of a vehicle during utilization thereof. This versatility, then, of providing such an effective storage/display article with all the other benefits accorded therein, is highly unexpected and of great utility.

Having described the invention in detail it is obvious that one skilled in the art will be able to make variations and modifications thereto without departing from the scope of the present invention. Accordingly, the scope of the present invention should be determined only by the claims appended hereto.

What I claim is:

1. A storage/display article comprising a first upper component and a second lower component, wherein said first upper component is a structure having two opposing curved ends and two opposing middle parallel and straight edges, said first upper component present within a single plane and further having a straight midline component running between the outermost edges of said opposing curved ends, wherein said second lower component has two separate legs extending below said first upper component, wherein each of said second lower component separate legs include opposing middle parallel and straight edges and outermost ends that turn upward at uniform inclines or curves, and wherein said outermost ends of said second lower component separate legs extend to points that are beyond the outermost edges of said two opposing curved ends of said first upper component.

2. The storage/display article of claim 1 further comprising attachment means for attaching said storage/display article to different surfaces, said attachment means selected from suction cups, adhesives, and clips, wherein said attachment means are either incorporated within said storage/display article or attached thereto externally.

3. A method of storing and displaying at least one clothing or headwear article, said method including the steps of:
   i) including said storage/display article of claim 1;
   ii) attaching said storage/display article to a surface or implement within the internal confines of an automobile;

iii) placing said at least one clothing or headwear article over at least one of said opposing curved ends of said first upper component of said storage/display article.

\* \* \* \* \*